US006373557B1

(12) United States Patent
Mengel et al.

(10) Patent No.: US 6,373,557 B1
(45) Date of Patent: Apr. 16, 2002

(54) METHOD AND APPARATUS FOR PICKING UP A THREE-DIMENSIONAL RANGE IMAGE

(75) Inventors: Peter Mengel, Eichenau; Günter Doemens, Holzkirchen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,091

(22) PCT Filed: Nov. 14, 1998

(86) PCT No.: PCT/DE98/03344

§ 371 Date: Jun. 9, 2000

§ 102(e) Date: Jun. 9, 2000

(87) PCT Pub. No.: WO99/34235

PCT Pub. Date: Jul. 8, 1999

(30) Foreign Application Priority Data

Dec. 23, 1997 (DE) ......................................... 197 57 595
Jul. 23, 1998 (DE) ......................................... 198 33 207

(51) Int. Cl.$^7$ ................................................. G01C 3/08
(52) U.S. Cl. ..................................... 356/4.07; 356/5.05
(58) Field of Search ........................... 356/4.07, 5.05, 356/5.06, 5.07, 5.08, 5.03

(56) References Cited

U.S. PATENT DOCUMENTS 3,608,547 A * 9/1971 Sato et al. .................. 356/4.07
5,446,529 A * 8/1995 Stettner et al. ............. 356/4.01

FOREIGN PATENT DOCUMENTS

| DE | 37 32 347 | 3/1989 |
|---|---|---|
| DE | 38 39 513 | 5/1992 |
| DE | 41 29 912 | 10/1992 |
| DE | 196 19 186 | 1/1998 |
| EP | 0 151 257 | 8/1985 |
| EP | 0 363 735 | 4/1990 |
| EP | 0 465 806 | 1/1992 |
| WO | WO 97/11353 | 3/1997 |

OTHER PUBLICATIONS

Scientific CMOS CID imagers, Zarnowski et al., Proc. SPIE vol. 2654, p. 29–37, Solid State Sensor Arrays and CCD Cameras, Mar. 1996.*

* cited by examiner

Primary Examiner—Thomas H. Tarcza
Assistant Examiner—Fred H. Mull
(74) Attorney, Agent, or Firm—BakerBotts LLP

(57) ABSTRACT

A method and apparatus for generating three-dimensional range images of spatial objects, wherein a short-time illumination of the object is performed, for instance using laser diodes. An image sensor is used that has a high light sensitivity, pixel resolution and can be read out randomly, this sensor also having an integration time that can be adjusted for each pixel. By evaluating the backscattered laser pulses in two integration windows with different integration times and by averaging over several laser pulses, three-dimensional range images can be picked up with a high reliability in, for example, 5 ms at the most.

45 Claims, 8 Drawing Sheets

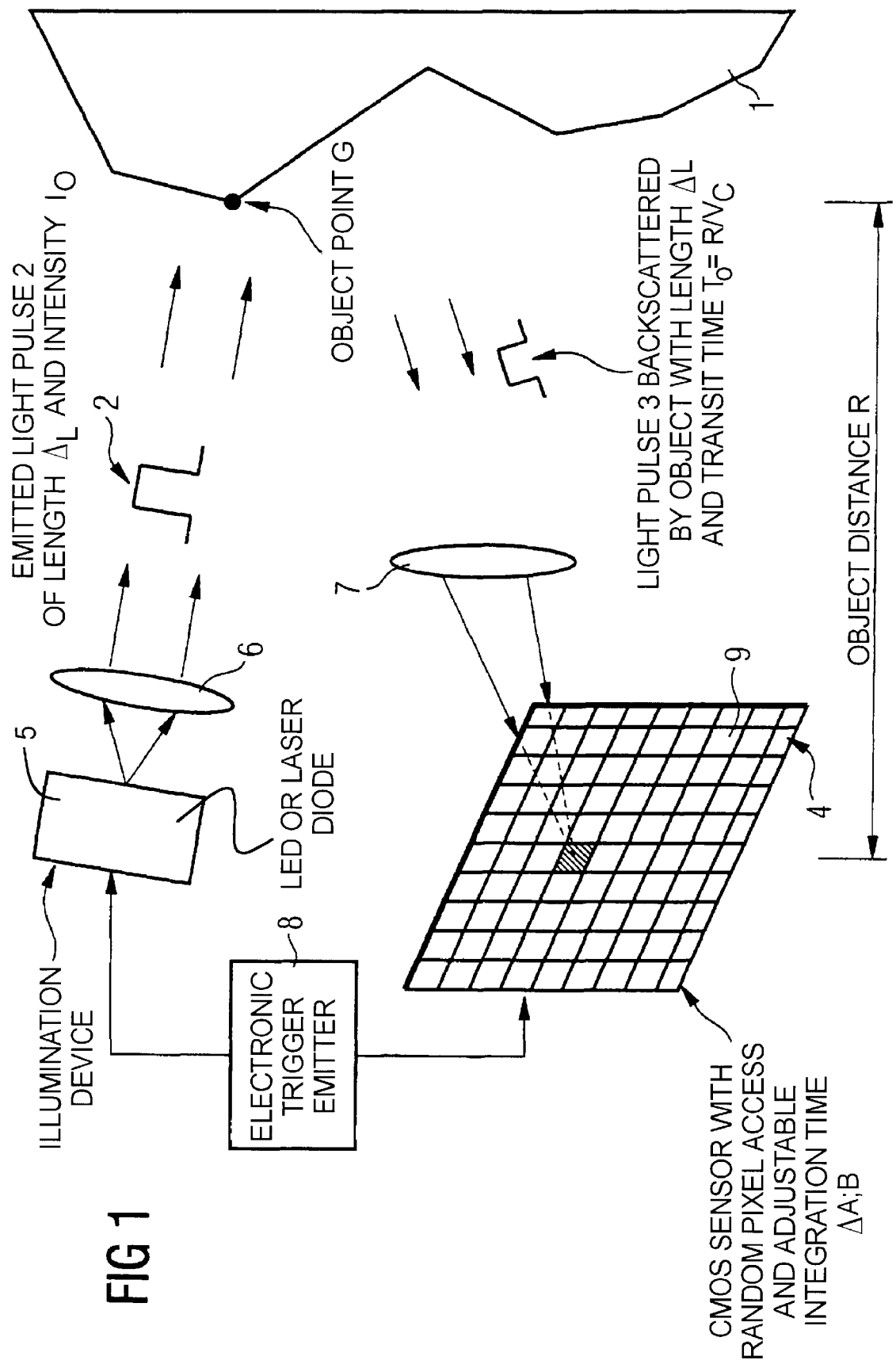

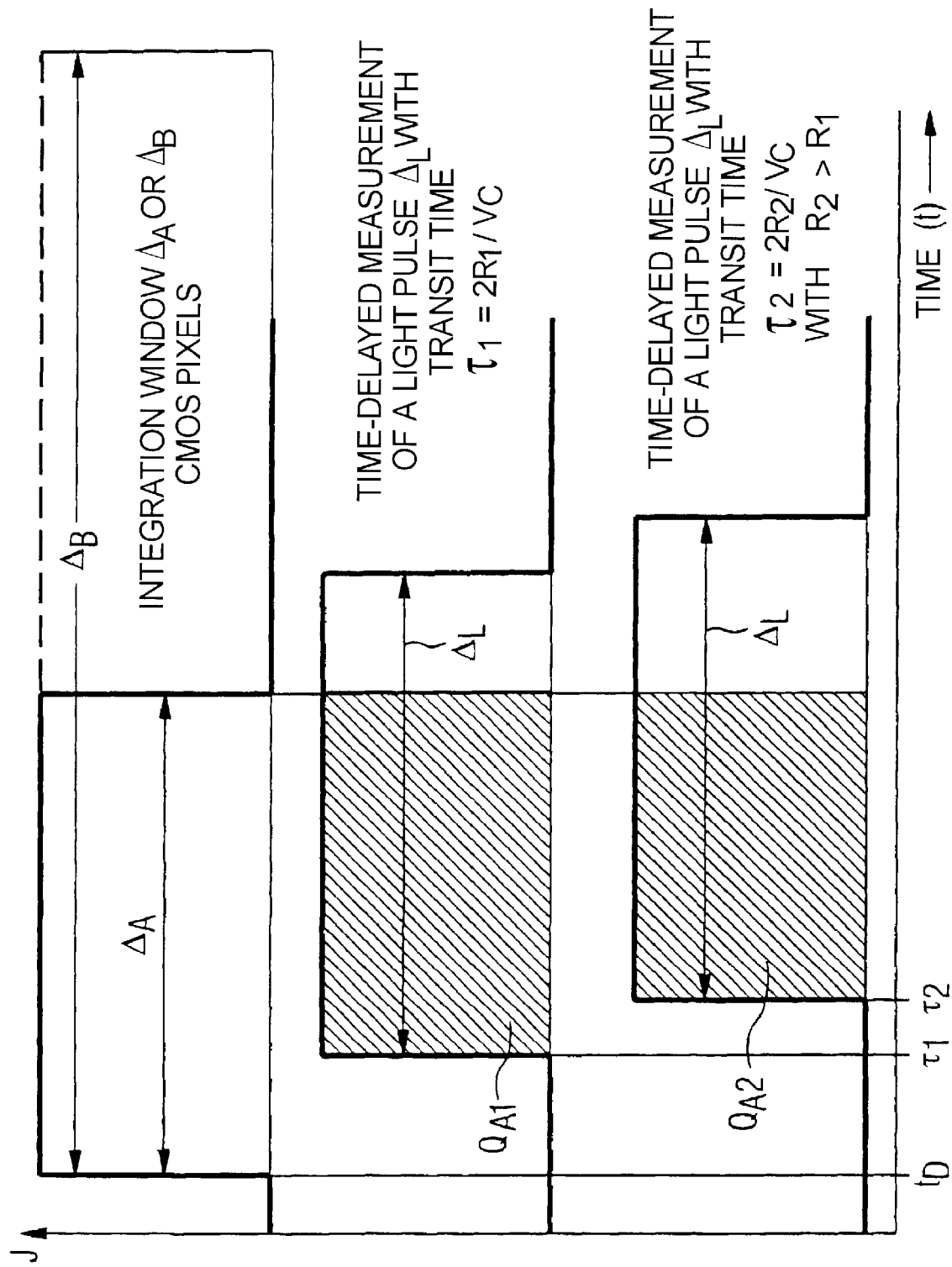

FIG 3

CMOS SENSORS WITH VARYING INTEGRATION TIMES BY ROWS FOR PIXELS A,B

| A | A | A | A | A | A | A |
|---|---|---|---|---|---|---|
| A | B | A | B | A | B | A |
| A | A | A | A | A | A | A |
| A | B | A | B | A | B | A |
| A | A | A | A | A | A | A |
| A | B | A | B | A | B | A |
| A | A | A | A | A | A | A |

PIXEL A: SHORT INTEGRATION TIME $\Delta_A \leq \Delta_L$
PIXEL B: LONG INTEGRATION TIME $\Delta_B >> \Delta_L$

INTENSITY IMAGE READOUT OF PIXELS B BY ROWS

3D RANGE IMAGE: DIFFERENCE FORMATION AND NORMALIZATION BY ROWS (PIXEL A - PIXEL B)/PIXEL B

CMOS SENSORS WITH VARYING INTEGRATION TIMES BY PIXELS FOR PIXELS A,B.

INTENSITY IMAGE: READOUT OF PIXELS B BY PIXELS

3D RANGE IMAGE: DIFFERENCE FORMATION AND NORMALIZATION BY PIXELS (PIXEL A - PIXEL B)/PIXEL B

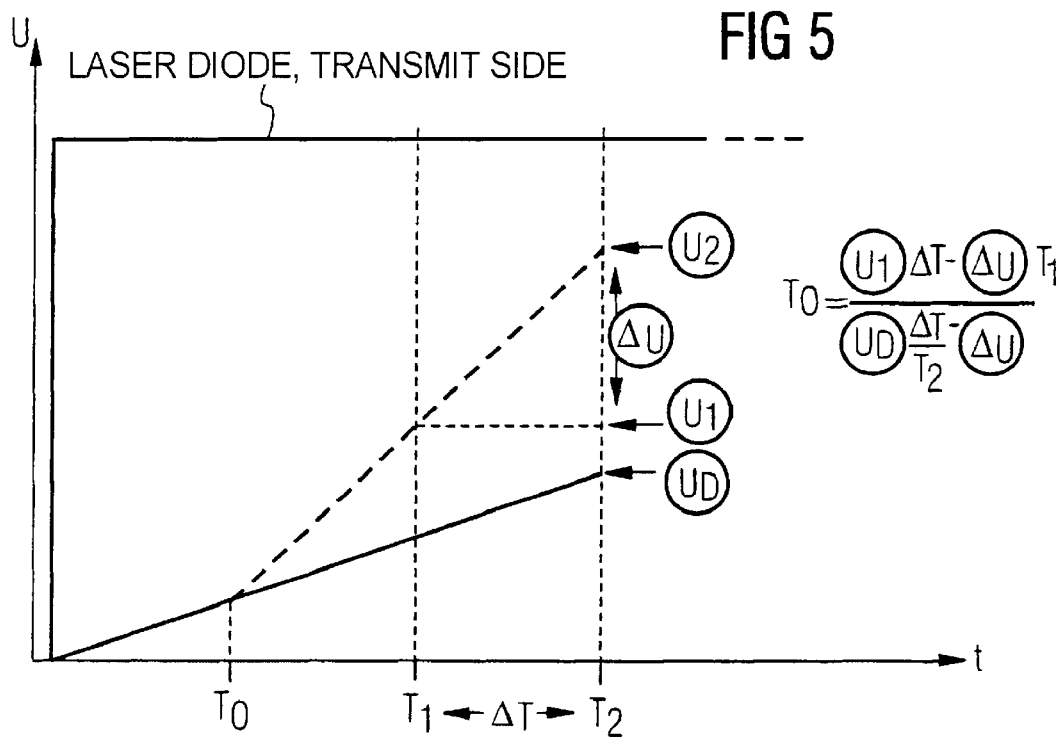
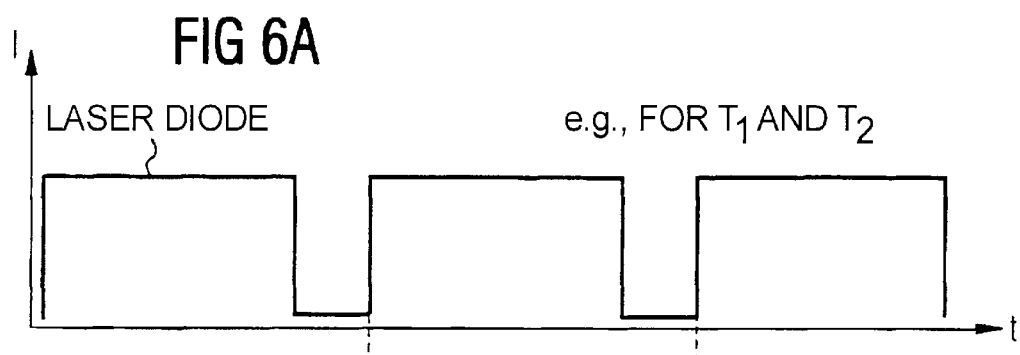
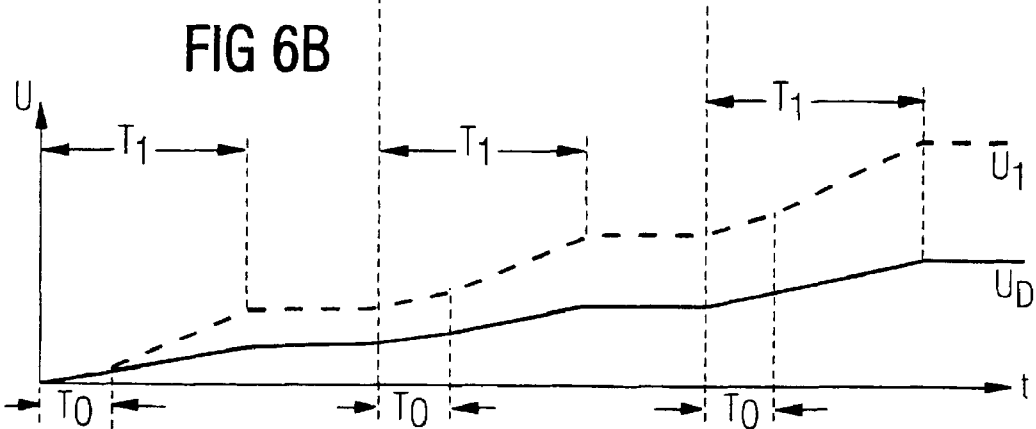

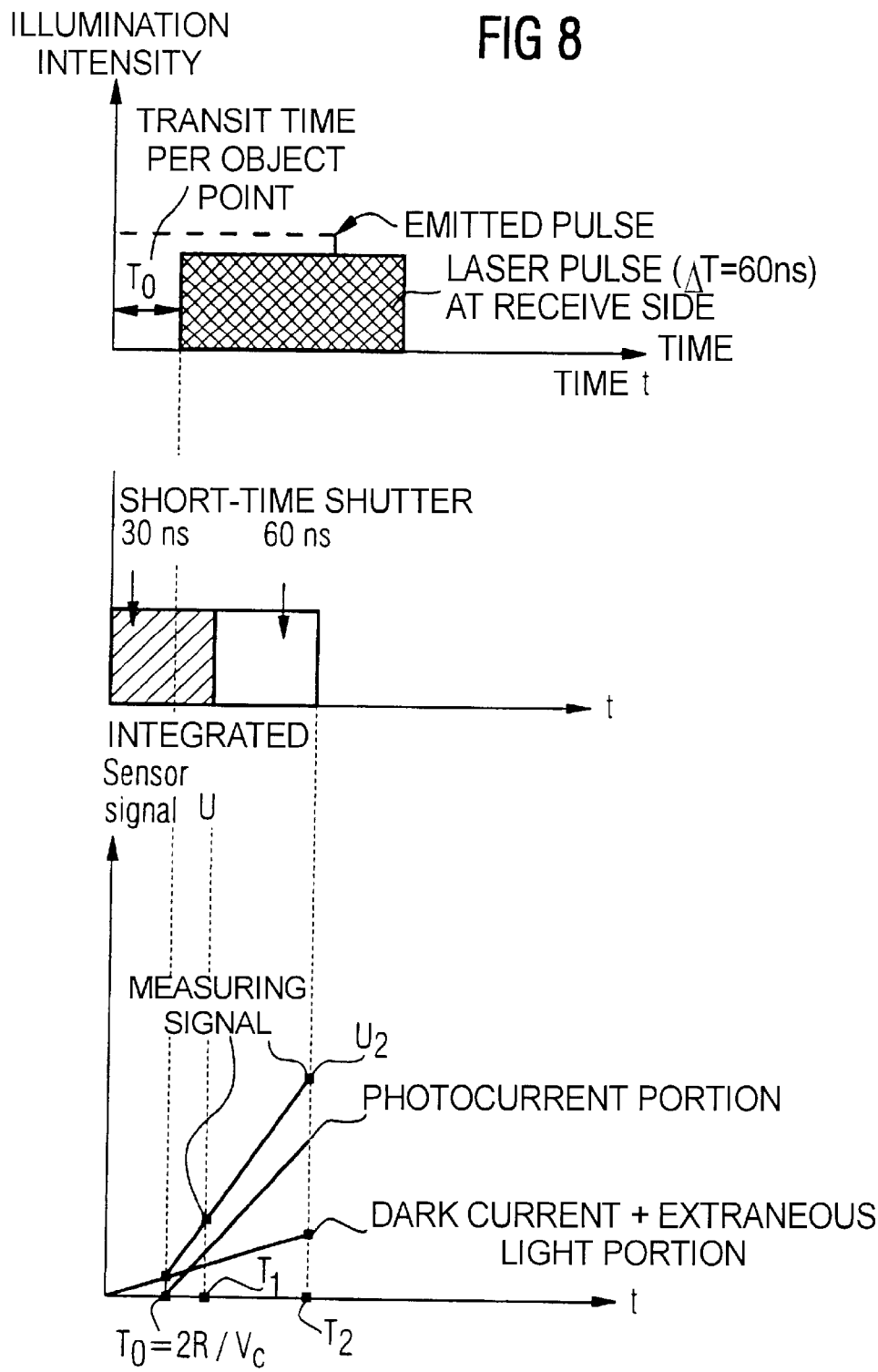
INTERPOLATION METHOD: TRANSIT TIME $T_0$ =INTERSECTION OF MEASURING SIGNAL AND CURVE FOR THE SUM OF THE DARK CURRENT AND ENVIRONMENTAL LIGHT

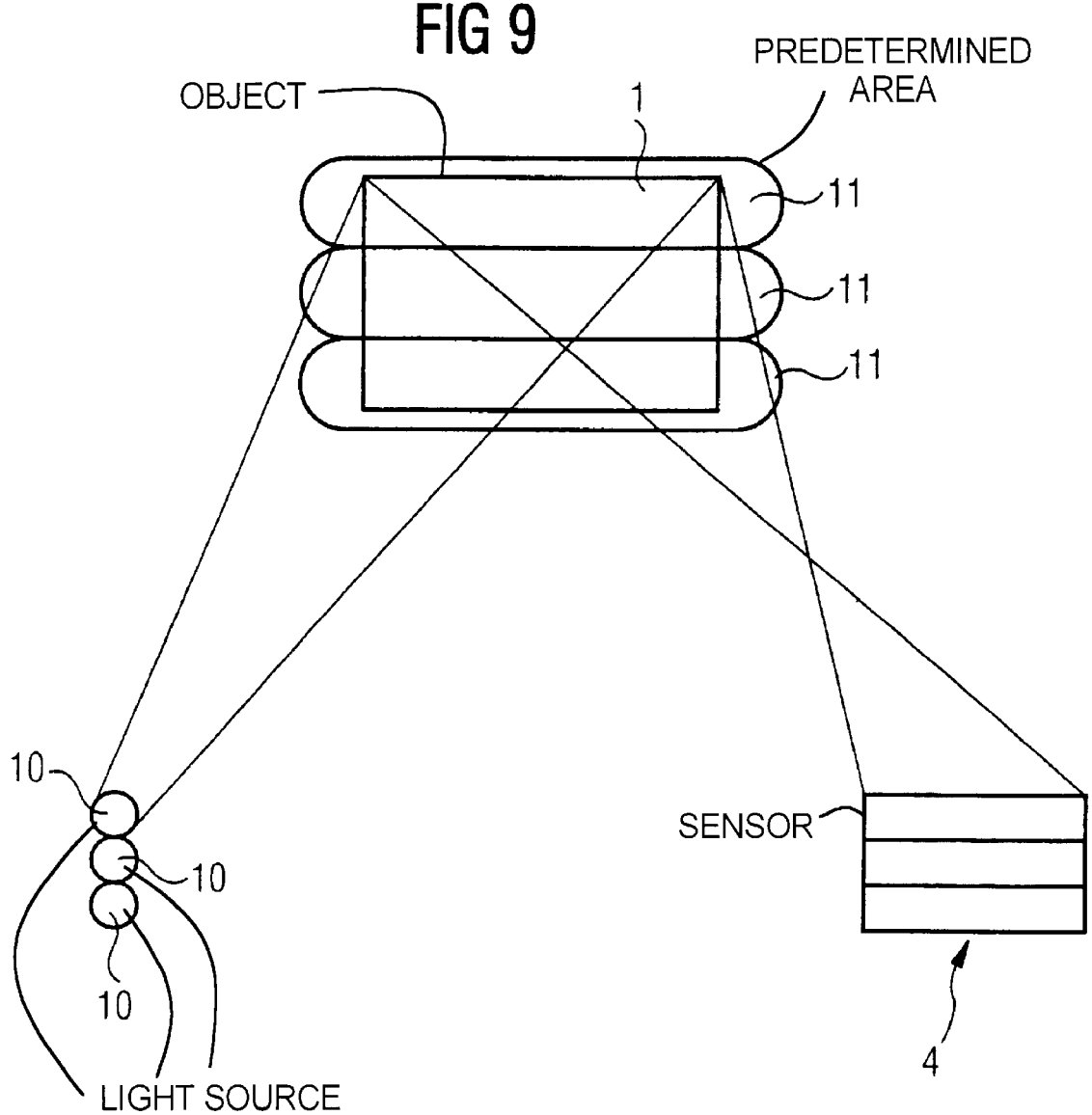

METHOD AND APPARATUS FOR PICKING UP A THREE-DIMENSIONAL RANGE IMAGE

BACKGROUND OF THE INVENTION

The present invention relates to a method and a device for picking up a three-dimensional range image of spatial objects.

Three-dimension projection and processing sensor systems are becoming more and more important for a variety of tasks in industrial technology. Known optical radar systems such as laser radar are based either on the principle of measuring laser pulse transit times or on the determination of the phase difference of modulated laser light for the purpose of deriving the object's distance. Additional mechanical scanning devices are necessary in order to build a three-dimensional imaging system. This leads to a relatively expensive electronic and mechanical outlay, which limits the use of such three-dimensional systems to a few specific applications.

There are known methods that employ a CCD camera (Charged Coupled Device), for which cameras the TV standard is applied. Relatively long readout times, however, are results of these methods.

SUMMARY OF THE INVENTION

It is the object of an invention to provide a method for recording a three-dimensional range image and an apparatus with which a rapid and economical method can be provided for obtaining a three-dimensional range image for spatial objects without costly mechanical mechanisms.

According to an aspect of the present invention, a method is provided for picking up a three-dimensional range image of spacial objects using an optoelectronic sensor with pixel resolution having electronic short-time integrators for each pixel element within the sensor and wherein an integration time can be adjusted. The method includes the steps of illuminating an object having a plurality of object points with one or more light pulses each having a predetermined period $\Delta_L$. Light pulses are then sensed with the sensor that have been backscattered by object points of the object at corresponding pixels of the sensor within a predetermined short integration time $\Delta_A$, where $\Delta_A \leq \Delta_L$. Additionally, a time essence for the beginning of the predetermined short integration time $\Delta_A$ proceeds incidence of the first backscattered light pulse at the sensor, which corresponds to a nearest object point. Next, intensities of each of the sensed light pulses that have been backscattered by the object points are registered and distance values are computed from different registered intensities of the backscattered light pulses resulting from their different transit times.

According to another aspect of the present invention a method for picking up a three-dimensional range image of spacial objects using an optoelectronic sensor with pixel resolution includes the steps of first picking up and integrating the sensor signal of the sensor from the beginning of the picking up and integration to a defined integration time $T_2$. This integration represents dark current and environmental light. Next, an object is illuminated by an illumination device simultaneous to the beginning of the picking up and integration of the sensor signal at the sensor. The integration occurs during a light intensity rise of the light received at the sensor up to an integration time $T_1$ where $T_1 \leq T_2$. The object is then repeatedly illuminated by the illumination device with simultaneous starting of the picking up and integration of the sensor signal at the sensor, wherein integration occurs within the light intensity rise of the light received at the sensor up to the integration time $T_2$ the respectively integrated value of the sensor signal for all pixels is readout and stored at times $T_1$ and $T_2$. A transit time $T_0$ of the light from the illumination device to the sensor via the object and a corresponding distance value based on the stored integrated values is calculated for each pixel.

According to yet another aspect of the present invention, an apparatus for picking up a three-dimensional range image is featured including an illuminating device that emits light pulses onto an object via a first optical system. An optoelectronic sensor with a second optical system is configured to sense received light pulses backscattered by the object within an adjustable integration time and is comprised of a plurality of pixel elements to provide a pixel resolution, the pixel elements being randomly readable and configured to adjust the integration time pixel by pixel. A triggering mechanism is included that is configured to provide time synchronization between the illumination device and the sensor. Finally, a computing unit is included to calculate a three-dimensional image from corresponding charges of pixel elements of the sensor that have been charged by the received light pulses.

The present invention is based on the recognition that an extremely fast registration of a three-dimensional range image is possible using a randomly readable optoelectronic sensor with pixel resolution whose integration time can be adjusted point by point. To this end, an object is illuminated with one or more very short light pulses, whereupon light impulses of the same length are backscattered by the object. These backscattered light pulses are conducted to the optoelectronic chip via a corresponding optical system. Owing to the difference in the distances of different points of the object from the sensor, backscattered light pulses that correspond to respective locations will arrive at the sensor at different times. A time measuring window is opened for ranging whose duration corresponds to a predeterminable integration time. The integration time is less than or equal to the length of the emitted and, thus, of the reflected light pulses. Hence, is guaranteed that a uniform cutoff of the backscattered light pulses occurs at the sensor at the end of the integration time. The light pulses of each pixel element that arrive with a time delay are cut off in back, so that the different transit times can be converted into charge differences based on the different charges in the raster of the optoelectronic sensor. A three-dimensional range image can be computed in this way.

According to another embodiment of the invention, instead of a light pulse with a defined length, a mere light intensity rise having a steep edge is used, which is correspondingly registered and evaluated at the sensor. In this way, the measurement result becomes independent of the course of the trailing edge of the light pulse. On the other hand, the influence of a dark current, which is generated by the operating heat of a sensor element, and the environmental light (unwanted light) portion can be exactly compensated for each pixel. First, the dark current and the environmental light are acquired by a total of three consecutive measurements. Then the light quantities that are reflected by the object and received at the sensor are integrated in the form of a senor signal in the context of an illumination, this process then being repeated with a longer integration time. From this, the transit time of the light can be computed for each object point by a corresponding interpolation. This allows the possibility of using lower light powers while at the same time affords more precise measurement of the transit time and, thus, the distance to the object.

In an preferred embodiment of the invention, all light pulses are registered simultaneous with the above described measurement process using a very long integration time or are registered after this with their full length at a time offset. This is used for normalizing, so that differences in the reflection behavior of the object can be detected and compensated.

The essential advantages of the invention are that mechanical shutters are are not used, for example. Extremely short image pick-up times can, thus, be realized. The utilized optoelectronic sensor is generally referred to as a CMOS sensor, though this is merely the technical term for the semiconductor component. Using this type of sensor, minimum integration times of 50 to 30 nsec can be realized (jitter at less than 0.1%). Accordingly, technical development progresses with respect to the integration times.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 1 illustrates the functional principle for acquiring a three-dimensional range image using a CMOS sensor;

FIG. 2 is a schematic representation of a time shift of two light impulses whose pertaining object points are different distances from the CMOS sensor, relative to integration windows;

FIG. 3 shows two variants of the senor for simultaneously acquiring three-dimensional range images and intensity or gray value images, respectively, using a CMOS sensor;

FIG. 5 shows the ranging process using an integrated CMOS image sensor, with representation of the signal of the laser diode at the transmit side and of the sensor signals at the receive side;

FIG. 6 shows the ranging process using an integrated CMOS image sensor, with FIG. 6a representing the operation of a laser diode at the transmit side and FIG. 6b representing the sensor signals that are achieved by continuous integration at the sensor;

FIG. 8 shows the time correlation of the transmit-side and receive-side representation of a laser pulse, with two different short integration times provided in connection with the illumination control of the sensor.

FIG. 9 shows a schematic arrangement of light sources illuminating an object in predetermined areas, the light then being detected by sensors.

DETAILED DESCRIPTION OF THE PREFERRED EMBODIMENTS

Figure 4:
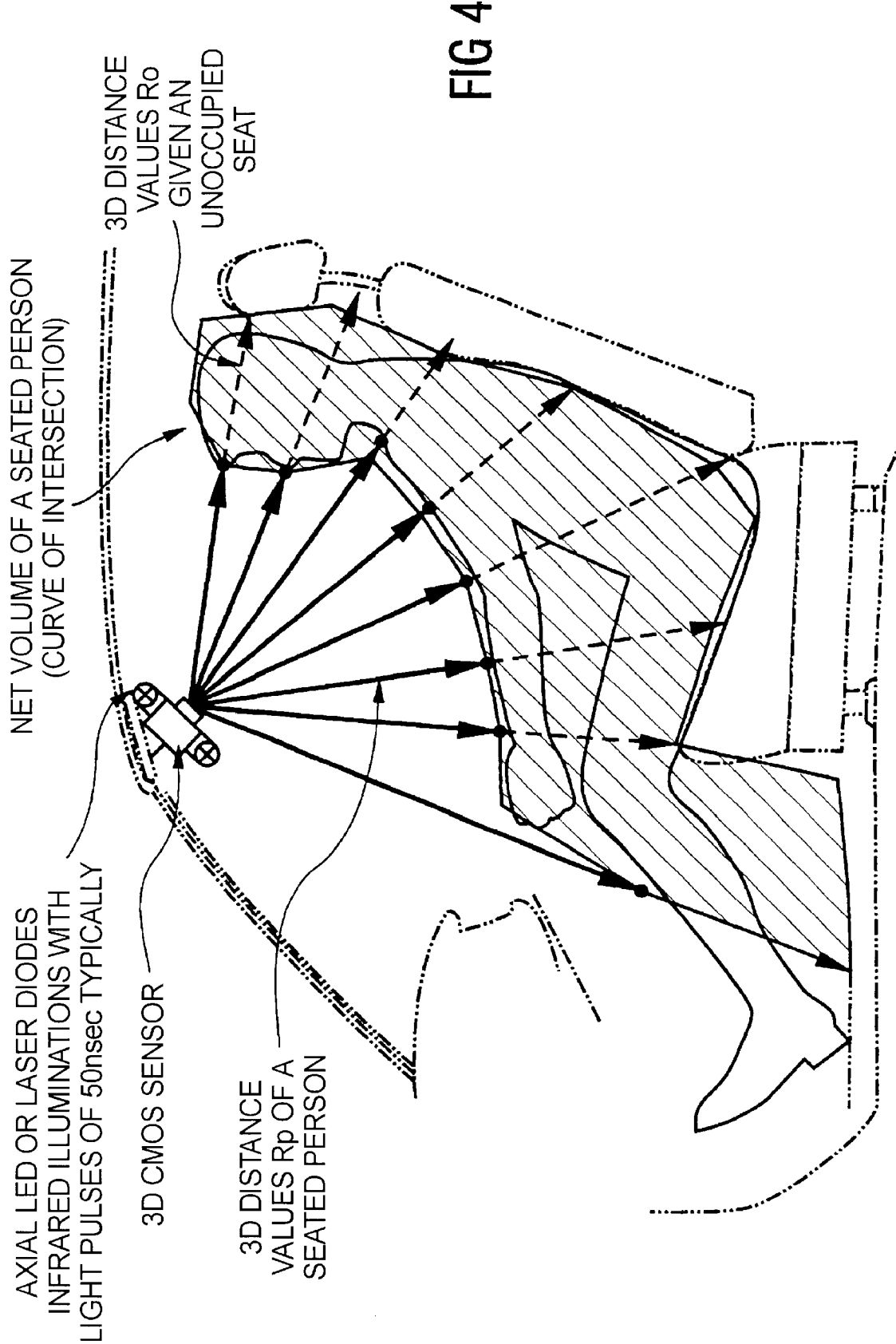
FIG. 4 shows the schematic representation of vehicle interior surveillance using a three-dimensional CMOS sensor.

A method is described for the serial and simultaneous acquisition or generation of an intensity and a three-dimensional range image of a spatial object using an optoelectronic sensor under short-term illumination. The method exploits the transit time differences between the light pulses that are backscattered by the three-dimensional objects in the pixel-synchronous detection at the sensor within short integration times. A CMOS sensor is used. This sensor has a photosensitivity of 1 mLux, for example. Furthermore, it has a high intensity dynamic of up to $10^7$, a random access to the individual pixels and an adjustable integration time (sample & hold) for measuring the charge quantity Q(t) given illumination at the individual pixel.

Compared to methods that use a CCD camera, particular advantages can be achieved, such as the parallel acquisition of intensity images and three-dimensional images and the realization of short image pick-up times well below the readout times of CCD cameras. Furthermore, the CMOS does not require expensive mechanical shutters, and high-powered laser light sources need not be used for the temporary illumination.

The method is particularly suited to detecting persons and movement sequences in surveillance applications, for instance for monitoring the interior or exterior of a vehicle for crane automation, and for navigation.

The essential functional features are detailed with the aid of FIG. 1. First, the spatial objects that are to be captured are illuminated using short light pulses, (e.g., <100 ns). The illumination can be performed with laser light, for instance with a pulsed laser diode or with light sources such as a pulsed LED diode. The method is independent of the angle of the illumination, which need not necessarily occur centrally in relation to the general direction of detection. It is also conceivable to use a ring light for coaxial illumination and detection. The arrangement represented in FIG. 1 serves only for the schematic illustration of the functional principle.

A first image pick-up A is connected with a short integration time $\Delta_A$ at the CMOS sensor. The light pulses 3 of the length $\Delta_L$ (<100 nsec) that are backscattered by the object points G of the three-dimensional scene 1 are acquired at the pixels 9 of the CMOS sensor within a set short integration time $\Delta_A \leq \Delta_L$. An electronic trigger pulse from elecronic trigger emitter 8 produces a fixed time relation between emitted light pulse 2 and the opening of the integration time window at the CMOS sensor. Due to the transit time of the light, there is a different time shift depending on object distance R of:

$$\tau = 2R/V_c \text{ (where } V_c = \text{speed of light)}$$

between the light pulse that is emitted and the pulse that is detected at the CMOS sensor. The charge $Q_A$ that is measured at the pixel within the integration time $\Delta_A$ thus becomes dependent on the distance R between the sensor and the object point G. See FIG. 2 in this regard.

Charge $Q_A$ is quantifiable accroding to:

$$Q_A \propto I_O * O_R(\Delta_L - (2R/V_C - t_D)) \tag{1}$$

where $I_O$ represents Intensity of the emitted light impulse;

$O_R$ represents a Surface reflection coefficient at the object point G; and $t_D$ is a trigger point time delay between emitted light pulse and start of the integration window at the CMOS sensor.

For object points G with the same surface reflection coefficient $O_R$, a different charge $Q_A$ is measured at the corresponding pixel of the CMOS sensor depending on their distance R. In this way, small differences in transit time of the light pulses are transformed into charge modifications $Q_A$ so that an integrated charge is representative of a respective object point G and its respective distance $R_{(1 \ldots)}$. In a CMOS sensor these can be detected with a high degree of sensitivity and with a high dynamic. Objects of a three-dimensional scene usually.

The objects of a three-dimensional scene usually have different surface relfections. Therefore, for the purpose of normalizing the range image, a second image pick-up $Q_B$ is performed, which is dependent only on the surface reflection of the objects of the three-dimensional scene.

The execution of a second image pick-up B with a long integration time $\Delta_B$ serves for normalizing the surface reflection of the three-dimensional scene, where in principle, the customary intensity image or gray value image is used. To this end, in a second image pick-up a second integration time $\Delta_B$ is set at the CMOS sensor, which is quite large compared to the length of an illumination pulse ($\Delta_B \gg \Delta_L$ e.g. 1 microsecond). Now, all backscattered light pulses 3 are detected in full at the CMOS sensor, regardless of their transit time. The charge $Q_B$ measured at a pixel is computed according to the following equation:

$$Q_B \propto I_0 \cdot O_R \cdot \Delta_L. \quad (2)$$

The image obtained is dependent only on the illumination intensity $I_0$, the coefficient of surface reflection $O_R$ of the corresponding object point, and the length $\Delta_L$ of the light pulse.

The two-dimensional range image $Q_R$ is generated from the difference and normalization of image pick-ups A and B, or respectively, $Q_A$ and $Q_B$ according to the condition:

$$Q_R = (Q_A - Q_B)/Q_B \quad (3)$$

With $t_D = 0$, the result of equation (3) substituting the conditions of equations 1 and 2 is:

$$Q_R \propto -2RJ(V_c^* \Delta_L) \quad (4)$$

This value can be output directly as range image $Q_R$ subsequent to the readout, digitization and additional scaling for all pixels. If the trigger delay time $t_D$ does not equal 0, then the following constant offset is added to all points of the range image $Q_R$:

$$R_D = t_D/(V_c^* \Delta_L) \quad (5)$$

$R_D$=Distance value given $t_D$ (charge offset).

The simultaneous pick-up of intensity images and three-dimensional images is related to an execution of a spatially and chronologically parallel acquisition of intensity values and distance values. To accomplish this, a chip architecture and a pixel-related integration time are selected such that directly adjacent pixels A and B corresponding to FIG. 3 pick up the backscattered light impulses 3 of the three-dimensional scene on the CMOS sensor with a short integration time $\Delta_A \leq \Delta_L$ (for pixel A) and acquire these impulses with a long integration time $\Delta_B \gg \Delta_L$ simultaneously. Using an electronic circuit that is integrated on the chip, the two-dimensional range image of the allocated pixels A and B can then be directly computed according to the equation:

$$Q_R = (Q_A - Q_B)/Q_B;$$

and outputted.

FIG. 3 is a schematic of two possible arrangements on the CMOS sensor for the parallel detection of intensity and the three-dimensional range image. Further variants are possible for this. The simultaneous detection of intensity and the three-dimensional range image is important, particularly for the analysis of moving three-dimensional scenes, such as the detection of human gestures or for tracking an object.

If necessary, an additional normalizing of the three-dimensional range image with respect to environmental light may be executed. To do this, the charge of a pixel is first acquired with short and long integration times without illumination of the three-dimensional scene or the object, respectively, and subtracted from charges $Q_A$ and $Q_B$ that are measured under illumination. This is followed by the calculation of the range image.

Also, sensitivity of the method to noise can be increased given low backscattered light intensities by forming a time average of the signals of several light impulses. The measurement uncertainty for the distance determination depends on the signal/noise ratio of the CMOS sensor. Transit time differences as low as 0.1 ns should still be detectable. This results in a measurement uncertainty of less than 3 cm for the distance determination.

The applications of a preferred embodiment of the method and the apparatus of the present invention relate to the monitoring of interior spaces, particularly in vehicles, in connection with volumetric evaluation methods. An object of the optical surveillance of interior space in vehicles is to detect seat occupancy (e.g., people, child seats, or other objects), to register the seat position of people, and for security against theft; (i.e., registering the unauthorized penetration into the interior of the vehicle from the outside. The detection of people and their seat position is extremely important in terms of safety for the gradual release of an airbag (smart airbag) and must be performed very reliably and in short measuring times. The present invention satisfies these requirements by a rapid and reliable generation of a three-dimensional range image $Q_R$ in the vehicle interior, wherein volumetric evaluation methods are employed. There, the portions of net volume in the vehicle's interior that are occupied by objects 1 is determined from the distance values R in a solid angle element $\Omega$ as the difference relative to the distance values when the vehicle's interior is unoccupied (See FIG. 4).

The present method and apparatus deliver other significant advantages, such as fast, global detection of the current seat occupancy by forming the difference of a three-dimensional range image of the vehicle interior without objects (three-dimensional reference image $Q_{RO}$) and the three-dimensional range image, which is currently being evaluated, with a person or some other object $Q_{RP}$ on a seat. The following equation applies to the net volume $V_P$ of the seat occupancy:

$$V_P = \int_\Omega R_0(\Omega) * dF - \int_\Omega R_P(\Omega) * dF \quad (7)$$

where $R_0$ stands for the distance values without a person or other object, and $R_p$ stands for the distance values with a person or other object on the seat, and dF is a differential area.

The adaptive detection of the seat occupancy from the calculation of the relative distance changes before and after a person enters the vehicle can also be effected by the present invention. The reliability of the difference determination can be increased further by applying regressive and stochastic evaluation methods.

Determination of the size of detected objects and the global discrimination of objects via volume comparison classes are also possible with the present invention.

Spatial allocation of occupied volume portions is further possible with the present invention.

It is also possible to determine the spatial extreme positions (x,y,z) of the occupied volume in the interior for the purpose of controlling the airbag release mechanism.

Also volumetric tracking of movement sequences in the space given chronologically consecutive image pick-ups and difference formation. Is possible, as well as recognition of persons and gestures from the motion analysis.

This integral volume observation makes possible a global detection of objects and positions in space and is not reliant on the determination of features such as contours, corners, or edges in the image in order to recognize the object. The evaluation times can be under 10 ms for the three-dimensional image pick-up and the volumetric evaluation.

A vehicle interior is one particular field of application of the described method and apparatus. Here, an object is illuminated with LED impulses of, for instance, 50 ns (nanoseconds) for the three-dimensional image pick-up. The integration times at the CMOS sensor are selected at 50 ns for the image pick-up $Q_A$ and at 0.5 $\mu$s for the image pick-up $Q_B$. The scene dynamic, which is to be detected, in the vehicle interior should equal 200:1. The distance values R should be acquired with a measurement uncertainty <15 cm (having a corresponding transit time difference of a light impulse=1 ns) in a measurement range up to 1.5 m (transit time 10 ns).

With these requirements, an intensity dynamic of (10× 200=) 2000:1 is required at the CMOS sensor. The digital acquisition of the three-dimensional range image $Q_R$ is thus guaranteed by a 12-bit A/D converter. For a topical resolution of 50×50 pixels for the sensor, a maximum of $10^4$ read operations are necessary for the image pick-ups A with a short integration time and B with a long integration time. These read operations lead to a total image pick-up time for the three-dimensional range image of 5 ms at the most, given read frequencies of 2 Mhz, for example. The calculation of the difference volumes from the 2500 distance values can be performed in another 5 ms without difficulty using a fast processor such as a Pentium® operating at 200 Mhz.

FIG. 4 shows a schematic of an application of the invention in vehicle interiors. The arrows with broken lines represent an unoccupied seat, and those with solid lines represent a seat that is occupied by a person. For the global recognition of objects and the determination of position, the surrounding portion of net volume is determined from the three-dimensional distance data given an occupied and unoccupied vehicle. The net volume $V_P$ of a person or some other object on the car seat is calculated according to equation (7).

The method described previously for picking up a range image is based on a difference method, wherein the transit time equals $T_0 = U_P/U_{ges} * \Delta_A$, where:

$T_0$=transit time of the light, $\Delta_A$=integration time, $U_{ges}$=measuring signal for $A_B$–dark current portion for $\Delta_B$; and $U_P = U_{ges}$–(measuring signal portion for $\Delta_A$–dark current portion for $\Delta_A$).

Another preferred embodiment of the invention that is represented in FIG. 8 evaluates the registered measuring signals at the sensor by means of an interpolation method. The transit time of the light from the light source to the sensor via the object is given by the intersection of the curve of the measuring signal in FIG. 8, as it is crossed by the curve of the dark current portion. The following relation applies to the transit time of the light:

$$T_0 = 2R/V_c,$$

from which the distance value R derived.

Three-dimensional image acquisition, which is required in a number of industrial applications of image processing, is necessary particularly for the automatic surveillance of spaces, such as a car interior for example. Overly high requirements are not placed on the precision of the range image/range image. Range images with some 1000 pixels would already suffice for spatial surveillance in most cases. Conventional triangulation methods differ by cost, as well as on the basis of the large measurement base that is required.

Figure 7:
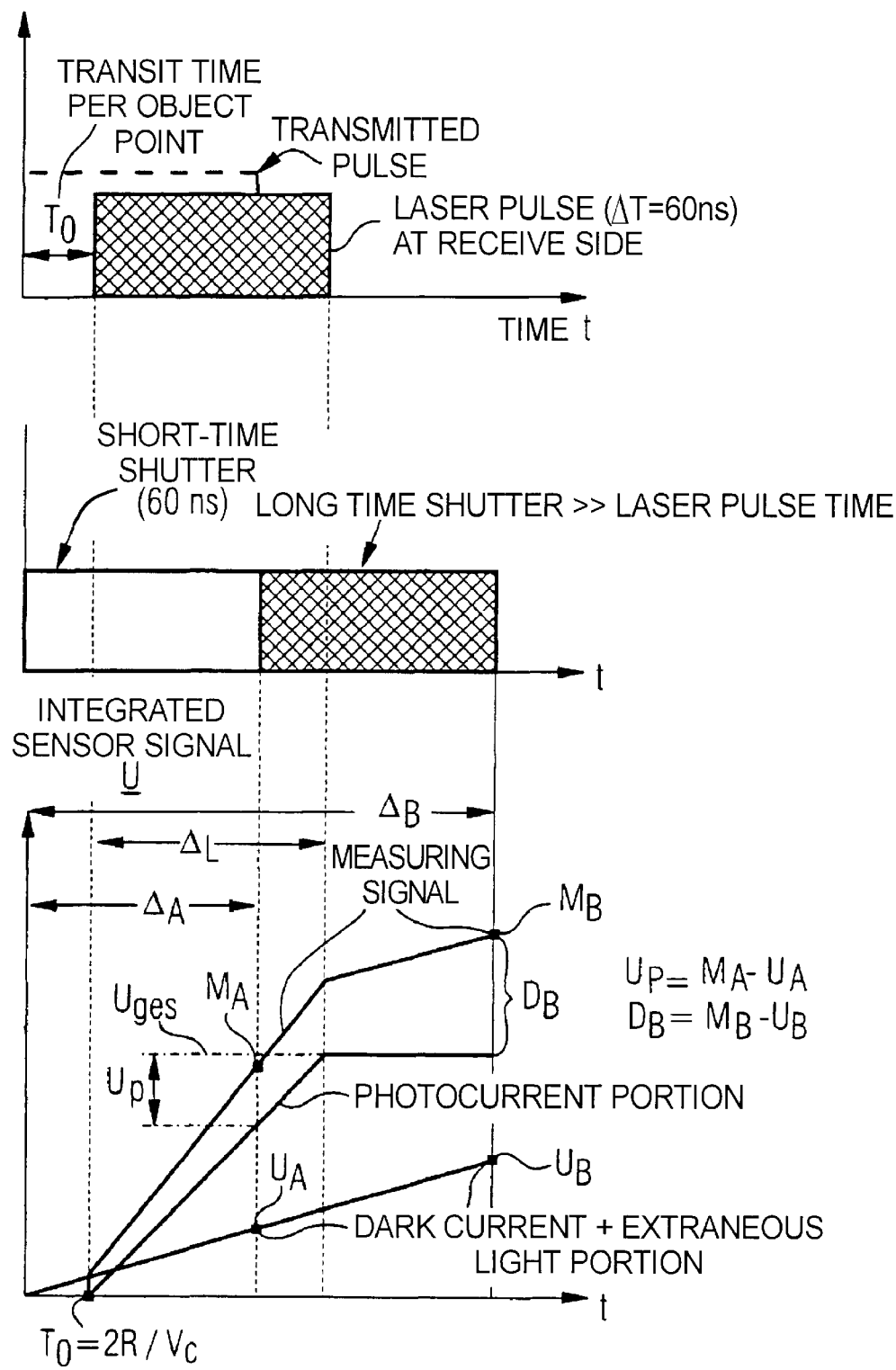
FIG. 7 is a time correlation showing the relations between illumination at the transmit side and detection of a laser impulse at the receive side, with measuring signals in the contexts of a short integration time and a very long integration time being represented at the bottom of the Figure.

Both the illumination type corresponding to FIG. 7 and the type corresponding to FIG. 8 can realize a fast and cost-effective pick-up of a three-dimensional range image. In the method represented in FIG. 8, the transit time of the light, which is necessary for the evaluation, is achieved for each image element point of the sensor 4 via the interpolation. Here, instead of a light pulse with a definite length, only a rise in light intensity with a steep edge is evaluated. The laser pulse reflected by the object is cut off by two different integration times. In this way, on one hand, the measuring signal becomes independent of the course of the trailing edge of the light pulse, and on the other hand, it is possible to precisely compensate for the influence of the dark current, which arises by virtue of the operating temperatures of a sensor, for example, and the influence of the environmental light for each pixel.

FIG. 5 shows the distance measurement with an integrated CMOS image sensor.

In the time t/sensor voltage U diagram, the laser diode illuminating at the transmit side is represented, by its rectangular light impulse. Below this, the measuring signals picked up at the receive side are represented. The solid line that leads generally from the origin of the coordinate system to the voltage $U_D$ is the first measurement performed and contains a dark current portion plus an extraneous light portion. $U_D$ is picked up at integration time $T_2$, which is greater than another integration time $T_1$. Next, the object 1 (shown in FIG. 1) is illuminated with the laser diode, whereupon only the dark currents in the individual pixels in connection with the extraneous light portion are integrated. When additional light is backscattered by the object point G owing to light transit time $T_0$, the measuring signal rises from time $T_0$ more sharply in correspondence to the brightness of the respective pixel. After a defined integration time $T_1$, the voltage $U_1$ for all pixels is read out and stored. The same process is repeated with the integration time $T_2$ that is already known from the first dark current measurement. For example, $T_1$ equals 30 ns and $T_2$ equals 60 ns. At the points at which the measuring signal intersects the times $T_1$ or $T_2$, respectively, which is equivalent to a cutoff of the received light pulse, the point $U_1$ or $U_2$ emerges, respectively. The relation $\Delta U = U_2 - U_1$ applies. The light transit time $T_0$ can be computed according to the formula represented in FIG. 5. If a line is extended through the points $U_2$ and $U_1$, further down this line intersects the line representing the dark current, which runs between the origin of the coordinate system and the voltage $U_D$. At the intersection, the light transit time $T_0$ can be read. All values for $U_1$ and $U_2$ or for $\Delta U$, for all pixels are likewise read out and stored. The transit time $T_0$ can be precisely and unambiguously computed for every pixel from the voltages $U_D$, $U_1$, $U_2$ and $\Delta U$ that are stored for each pixel, in connection with the predetermined integration times $T_1$ and $T_2$, even when there are relatively high dark current portions $U_D$. The following relation applies:

$$T_0 = U_1 \cdot \Delta T - \Delta U \cdot T_1/(U_D \cdot \Delta T/T_2 - \Delta U).$$

This affords the use of low light powers, while at the same time the transit time and thus the distance to the object are measured precisely.

A preferred embodiment provides that in order to reduce the laser power, which is extremely critical for reasons of cost, the above described process is repeated several times in succession, and the resulting values for $U_1$, $U_D$, and $\Delta U$ are read out and digitized only at the end of the multiple illumination of CMOS sensors. See FIGS. 6a and 6b in this regard. An analogous average value formation for the multiple illumination on the CMOS sensor also avoids the relatively long readout times in a later digital averaging. An adaptive adjusting to the respective reflectivity of the object in view of optimizing the signal/noise ratio of the measurement values is achieved in that, in a few test images, the number of illuminations is increased until a saturation of the values $n(U_1+\Delta U)$ sets in a defined quantity of pixels of the overall image; with n=the number of multiple illuminations.

The described steps make it possible to calculate the light transit time $T_0$ precisely given the presence of dark current and environmental light, to read out the signal from the CMOS sensor only after the multiple illumination, whereupon the digitization follows, and to be able to adaptively adjust the multiple illumination in accordance with the object's reflectivity. By these measures, a previously required laser power can be reduced by a factor of 10 to 20, or, the accuracy can be increased.

The sensor principle used in the image sensor is an integrated method, based on use of an $n^+$-p photodiode, for example. This photodiode is a component of an electronic short-term integrator, which also comprises a capacitor and several transistors. The connection is configured such that the capacity of the capacitor is discharged depending on the light that strikes the photodiode. This is controlled via what is known as a shutter transistor. Next, the potential remaining in the capacitor is read, for example. In order to guarantee a synchronized illumination, the time control of the electronic short-term integrator generates what is known as a strobe signal for controlling a light source. An electronic short-term integrator (electronic shutter) such as this is used for each pixel element 9 of the sensor 4. The potential that has already been tapped can also be used as measurement value instead of the potential remaining in the capacitor at the end of a measurement.

FIG. 6a shows several laser pulses that are switched in succession at the transmit side. The integration time $T_1$ is represented in FIG. 6b in connection with the respective voltage $U_1$ and the dark current portion $U_D$. The same can be mapped for $T_2$, $U_2$ and $U_D$. For every illumination or multiple illumination, there results a value for the light transit time $T_0$.

By contrasting FIGS. 7 and 8, it can be seen that the interpolation method corresponding to FIG. 8 has shorter illumination times. The average shutter times of 30 ns, for example, as and 60 ns represented in FIG. 8 and 60 ns as represented in connection with a very long laser pulse period in FIG. 7 should define the integration times at the sensor. In the top graph of FIG. 7, the time relation between the illumination at the transmit side and the arrival of the laser pulse at the receive side is shown. The embodiments represented in the FIGS. 5 to 8 do not have a trigger delay time. This means that the measurement window is opened at the receive side with the beginning of the sensor impulse. For the representation in FIG. 7, this means that the short-term shutter (60 ns) cuts off the received laser pulse (related to an object point or image element point) at time $\Delta_A$. The period of the light impulse is $\Delta_L$ at the transmit and receive sides. It is clear that, on the basis of the different light transit times, the electronic short-term integrator at the sensor delivers a respective potential as measurement value that is integrated depending on the transit time from the time $T_0$ to the end of and $\Delta_A$. In the case of FIG. 7, the integration time $\Delta_B$ is used to compensate reflectivity differences at the object 1. There, a dark current and an extraneous light portion are calculated, which can be correspondingly subtracted from the measuring signal.

FIG. 8 shows a diagram that corresponds to FIG. 7, the upper graph of which is identical to that of FIG. 7. In the middle of FIG. 8, two short-term shutter times are shown. These are used to cut off the laser pulses that impinge at the sensor 4, as in FIG. 7. Thus, there is a shorter integration time $T_1$ and a longer integration time $T_2$.

The measuring signal has a dark current and extraneous light portion as shown in FIGS. 7 and 8. The measuring signal is thus the result of the addition of the photocurrent portion to the dark current and the extraneous light portion. In other words, the photocurrent portion can be computed in that the dark current and extraneous light portion are attracted from the measuring signal. The transit time $T_0$ of the light emerges at the point on the time axis at which, given an incident reflected light pulse, the measuring signal diverts from the normal course of the dark current and extraneous light portions because the photocurrent portion is no longer zero. The evaluation which yields the light transit time $T_0$ was described in connection with FIG. 5.

To reduce the laser power significantly, a measurement object is partially illuminated in series. Illumination and evaluation occur simultaneously. Thus, an object 1 is partially illuminated and respectively evaluated in series, wherein a specific part of the object 1 is allocated to one or more light sources 10, respectively. Beyond this, the rise time of the intensity of a light source 10, for instance of a laser, can be significantly shortened, possibly to 0.1 ns.

FIG. 9 shows a schematic arrangement of three light sources 10, that respectively illuminate an object 1 in predetermined areas 11. The sensor 4 receives the reflected light portions that correspond to the partial areas 11 on the object 1 and processes them. This development allows the limitation, for instance, of the laser power of an illumination unit that has a laser. The serial illumination and detection can be realized cost-effectively, and it is not a problem to fall below maximum laser powers that are prescribed by specific standards. Furthermore, at the same time the rise time of the laser intensity can be shortened considerably, for instance to 0.1 nsec.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for picking up a three-dimensional range image of spatial objects using an optoelectronic sensor with pixel resolution having electronic short-time integrators for each pixel element within the sensor, wherein an integration time can be adjusted, comprising the steps of:

illuminating an object having a plurality of object points with one or more light pulses each having a predetermined period $\Delta_L$;

sensing light pulses with the sensor that have been backscattered by object points of the object at corresponding pixels of the sensor within a predetermined short integration time $\Delta_A$, where $\Delta_A \leq \Delta_L$, and wherein a time instant for a beginning of the predetermined short integration time $\Delta_A$ precedes incidence of the first backscattered light pulse at the sensor, which corresponds to a nearest object point;

registering intensities of each of the sensed light pulses that have been backscattered by the object points; and computing distance values from different registered intensities of the backscattered light pulses resulting from their different transit times.

2. The method as claimed in claim 1, wherein, all backscattered light pulses are sensed in their entirety with a long integration time $\Delta_B$ where $\Delta_B \gg \Delta_L$ for one of simultaneous normalizing and successive normalizing of surface reflection of the object.

3. The method as claimed in claim 1, wherein the time length of the light pulse is less than 100 ns.

4. The method as claimed in claim 1, wherein the object is illuminated with light pulses from one of a laser and a pulsed LED.

5. The method as claimed in claim 1, wherein the integrated sensor signal is read out for one of every individual pixel and a segment of pixels in a random pixel access process, wherein a segment can be a row of the optoelectronic image sensor.

6. The method as claimed in claim 1, wherein a spatial object is illuminated using two or more light sources that respectively partially illuminate the object;

wherein the two or more light sources are activated in series; and evaluation is performed for each respective partial illumination.

7. The method as claimed in claim 1, wherein the integration time is configured to be adjusted pixel by pixel.

8. The method as claimed in claim 1, wherein a beginning of integration times $\Delta_A$ and $\Delta_B$ is delayed by a trigger impulse delay relative to the emitted pulse.

9. The method as claimed in claim 1, wherein the integration time $\Delta_A$ is less than 100 ns.

10. The method as claimed in claim 1, wherein the integration time $\Delta_B$ is approximately 1 µs.

11. The method as claimed in claim 1, wherein different integration times $\Delta_A$ and $\Delta_B$ are respectively adjusted row by row in order to simultaneously acquire a three-dimensional image and a gray value image on the sensor.

12. The method as claimed in claim 1, wherein different integration times $\Delta_A$ and $\Delta_B$ are respectively adjusted pixel by pixel in order to simultaneously acquire a three-dimensional image and a gray value image on the sensor.

13. The method as claimed in claim 1, wherein the sensor is read out randomly.

14. The method as claimed in claim 1, wherein the sensor is a CMOS sensor.

15. The method as claimed in claim 1, wherein the distance from the sensor to at least one reference point is set as a reference distance.

16. The method as claimed in claim 15, wherein the reference point is located at a door frame of a vehicle.

17. The method as claimed in claim 1, wherein at least one of static objects and motion sequences is detected.

18. The method as claimed in claim 17, wherein the object is one of physical objects and persons located in at least one of defined spaces and vehicles being monitored.

19. The method as claimed in claim 18, wherein at least one of a seat occupancy and a seat position of a person is detected.

20. The method as claimed in claim 17, wherein at least one of vehicles and crane systems is monitored and wherein a general position determination is executed in a navigation system.

21. A method for picking up a three-dimensional range image of spatial objects using an optoelectronic sensor with pixel resolution having electronic short-time integrators for each pixel element, wherein an integration time can be adjusted, comprising the steps of:

picking up and integrating a sensor signal at the sensor from a beginning of the picking up and integration to a defined integration time $T_2$, the integration representing a dark current and environmental light;

illuminating an object by an illumination device simultaneous to the beginning of the picking up and integration of the sensor signal at the sensor, wherein integration occurs within a light intensity rise of the light received at the sensor up to an integration time $T_1$, and $T_1$ is less than $T_2$;

repeatedly illuminating the object by the illumination device with simultaneous starting of the picking up and integration of the sensor signal at the sensor, wherein integration occurs within the light intensity rise of the light received at the sensor up to the integration time $T_2$;

reading out and storing for all pixels the respectively integrated value of the sensor signal at the times $T_1$ and $T_2$; and calculating for each pixel a transit time $T_0$ of the light from the illumination device to the sensor via the object and a corresponding distance value based on the stored integrated values.

22. The method as claimed in claim 21, wherein the step of picking up the sensor signal is repeated multiple times, and the corresponding resulting signals for each individual pixel are integrated, and the steps of reading out, storing and evaluating of the sensor signals are only performed subsequent to the repeated illumination.

23. The method as claimed in claim 21, wherein the stored values are digitized.

24. The method as claimed in claim 21, wherein an adaptive adjustment to the reflectivity of the object occurs by increasing the number of multiple illuminations until the integrated intensity values at $T_1$ and at $T_2$ near a saturation point in a predetermined quantity of pixels of the overall image.

25. The method as claimed in claim 21, wherein at least one of the number of multiple illuminations and the intensity of the illumination device is increased until the integrated intensity values at $T_1$ and at $T_2$ near a saturation point for each individual pixel of the overall image.

26. The method as claimed in claim 21, wherein the integrated sensor signal is read out for one of every individual pixel and a segment of pixels in a random pixel access process, wherein a segment can be a row of the optoelectronic image sensor.

27. The method as claimed in claim 21, wherein a spatial object is illuminated using two or more light sources that respectively partially illuminate the object; and wherein the two or more light sources are activated in series and the evaluation is performed for each respective partial illumination.

28. The method as claimed in claim 21, wherein the integration time is configured to be adjusted pixel by pixel.

29. The method as claimed in claim 21, wherein a beginning of an integration time is delayed by a trigger impulse delay relative to the emitted pulse.

30. The method as claimed in claim 21, wherein the integration time is less than 100 ns.

31. The method as claimed in claim 21, wherein the integration time is approximately 1 µs.

32. The method as claimed in claim 21, wherein different integration times $T_1$ and $T_2$ are respectively adjusted row by row in order to simultaneously acquire a three-dimensional image and a gray value image on the sensor.

33. The method as claimed in claim 21, wherein different integration times $T_1$ and $T_2$ are respectively adjusted pixel by pixel in order to simultaneously acquire a three-dimensional image and a gray value image on the sensor.

34. The method as claimed in claim 21, wherein the sensor is read out randomly.

35. The method as claimed in claim 21, wherein the sensor is a CMOS sensor.

36. The method as claimed in claim 21, wherein the distance from the sensor to at least one reference point is set as a reference distance.

37. The method as claimed in claim 36, wherein the reference point is located at a door frame of a vehicle.

38. The method as claimed in claim 21, wherein at least one of static objects and motion sequences is detected.

39. The method as claimed in claim 38, wherein the object is one of physical objects and persons located in at least one of defined spaces and vehicles being monitored.

40. The method as claimed in claim 39, wherein at least one of a seat occupancy and a seat position of a person is detected.

41. The method as claimed in claim 38, wherein at least one of vehicles and crane systems is monitored and wherein a general position determination is executed in a navigation system.

42. An apparatus for picking up a three-dimensional range image, comprising:

an illuminating device that emits light pulses onto an object via a first optical system;

an optoelectronic sensor with a second optical system configured to sense received light pulses backscattered by the object within an adjustable integration time and is comprised of a plurality of pixel elements to provide a pixel resolution, the pixel elements being randomly readable and configured to adjust the integration time pixel by pixel;

a triggering mechanism configured to provide time synchronization between the illumination device and the sensor; and a computing unit for calculating a three-dimensional image from corresponding charges of pixel elements of the sensor that have been charged by the received light pulses.

43. The apparatus as claimed in claim 42, wherein a short integration time and a long integration time are alternately set for one of row by row and column by column at the pixel elements of the sensor.

44. The apparatus as claimed in claim 42, wherein short and long integration times are alternately set at the pixel elements of the sensor.

45. The apparatus as claimed in claim 42, wherein the computing unit is arranged on the sensor.

* * * * *